H. M. DUDLEY.
FIBER TREATING MACHINE.
APPLICATION FILED MAR. 13, 1918.

1,327,663.

Patented Jan. 13, 1920.
8 SHEETS—SHEET 5.

H. M. DUDLEY.
FIBER TREATING MACHINE.
APPLICATION FILED MAR. 13, 1918.

1,327,663.

Patented Jan. 13, 1920.
8 SHEETS—SHEET 6.

INVENTOR
Howard M. Dudley
BY
Howard Freeman
his ATTORNEY

H. M. DUDLEY.
FIBER TREATING MACHINE.
APPLICATION FILED MAR. 13, 1918.

1,327,663.

Patented Jan. 13, 1920.
8 SHEETS—SHEET 7.

INVENTOR
Howard M. Dudley
BY
Herman Freeman
his ATTORNEY

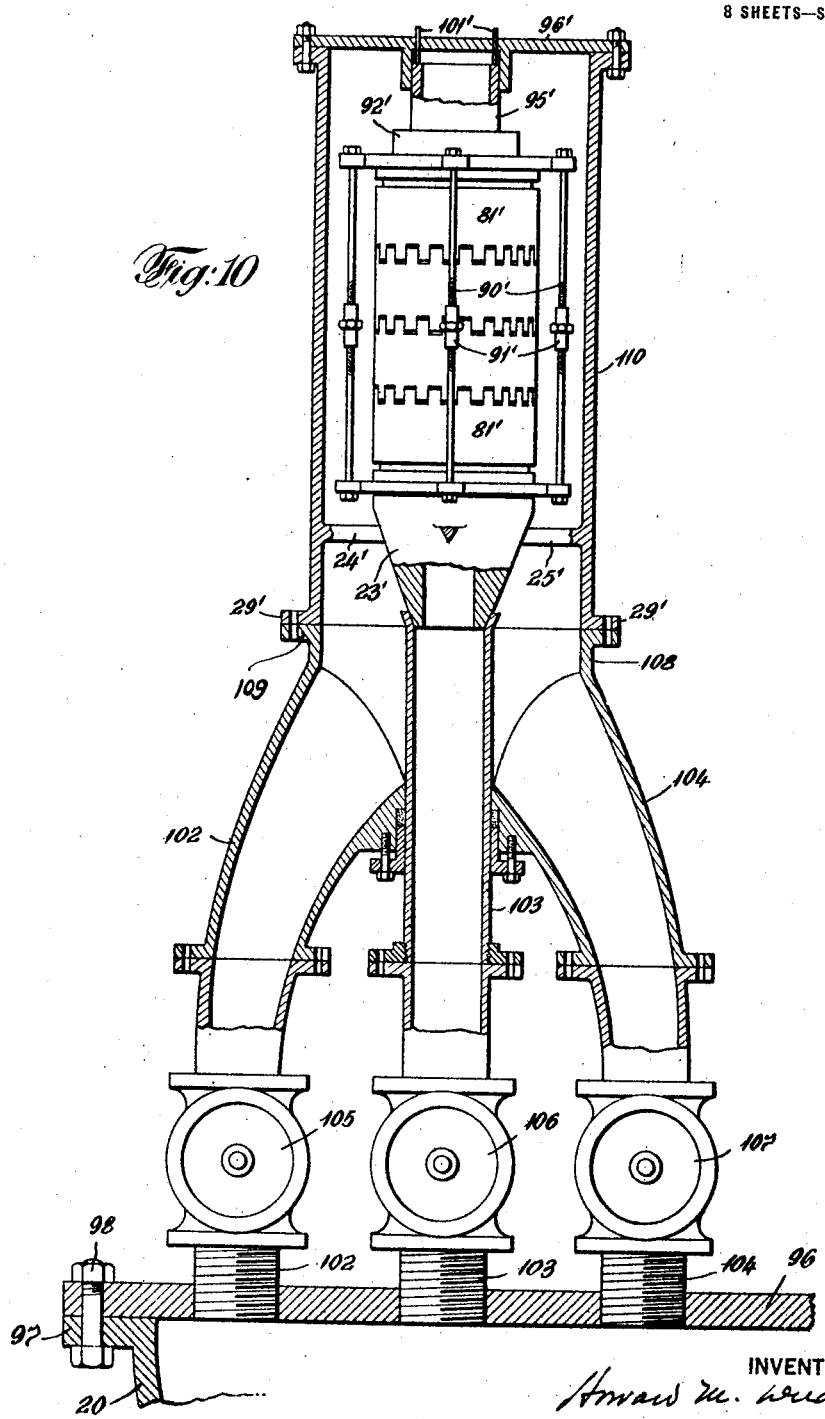

UNITED STATES PATENT OFFICE.

HOWARD M. DUDLEY, OF PHILADELPHIA, PENNSYLVANIA.

FIBER-TREATING MACHINE.

1,327,663.   Specification of Letters Patent.   Patented Jan. 13, 1920.

Application filed March 13, 1918. Serial No. 222,092.

*To all whom it may concern:*

Be it known that I, HOWARD M. DUDLEY, a citizen of the United States, residing in the city of Philadelphia, county of Philadelphia, and State of Pennsylvania, have invented certain new and useful Improvements in Fiber-Treating Machines, of which the following is a full, clear, and exact specification.

My invention relates to devices suitable for the dyeing of textile fibers and refers particularly to devices suitable for the dyeing of cops, spools and other similar forms of textile fibers in which the fiber is wound upon hollow central members.

One object of my invention is a device suitable for the dyeing of a number of wound fiber forms by the passage of a liquid therethrough.

Another object of my invention is a device in which a number of wound fiber forms may be compressed and treated evenly and uniformly by a liquid.

Another object of my invention is a device whereby a liquid may be passed uniformly in opposite directions through a number of wound fiber forms upon foraminous spindles.

Another object of my invention is a device whereby fiber wound upon foraminous spindles may be compressed without injury to the fiber.

Another object of my invention is a device suitable for the dyeing of wound fiber forms in which the condition of the dyeing treatment may be determined without opening the dyeing receptacle or interrupting the treatment therein.

These and other objects of my invention will be evident upon a consideration of my specification and accompanying drawings.

In the dyeing of wound fiber forms, such as cops, spools and similar forms, in which the fiber is wound upon foraminous hollow members, it is essential that the fiber be maintained in its original position upon the wound form, in order that it may be readily unwound therefrom. As these wound fiber forms do not contain a great length of fiber, a number must be treated simultaneously, and the device must allow the fiber to be packed in a uniform mass. Further, the liquid must be passed through the entire fiber mass uniformly and equally. It is further advantageous to have some means whereby the dyed condition of the fiber may be determined without opening the dyeing chamber or interrupting the dyeing operation.

The device of my invention accomplishes all of the above results in a manner economical in construction and cheap, simple, accurate and positive in operation and possesses, therefore, advantages which will be evident upon a consideration of my specification, drawings and claims.

In the drawings accompanying my specification and forming a part thereof, illustrating the device of my invention, similar parts are designated by similar numerals.

Fig. 10 is a vertical section of one of the testing devices.

Figure 1:
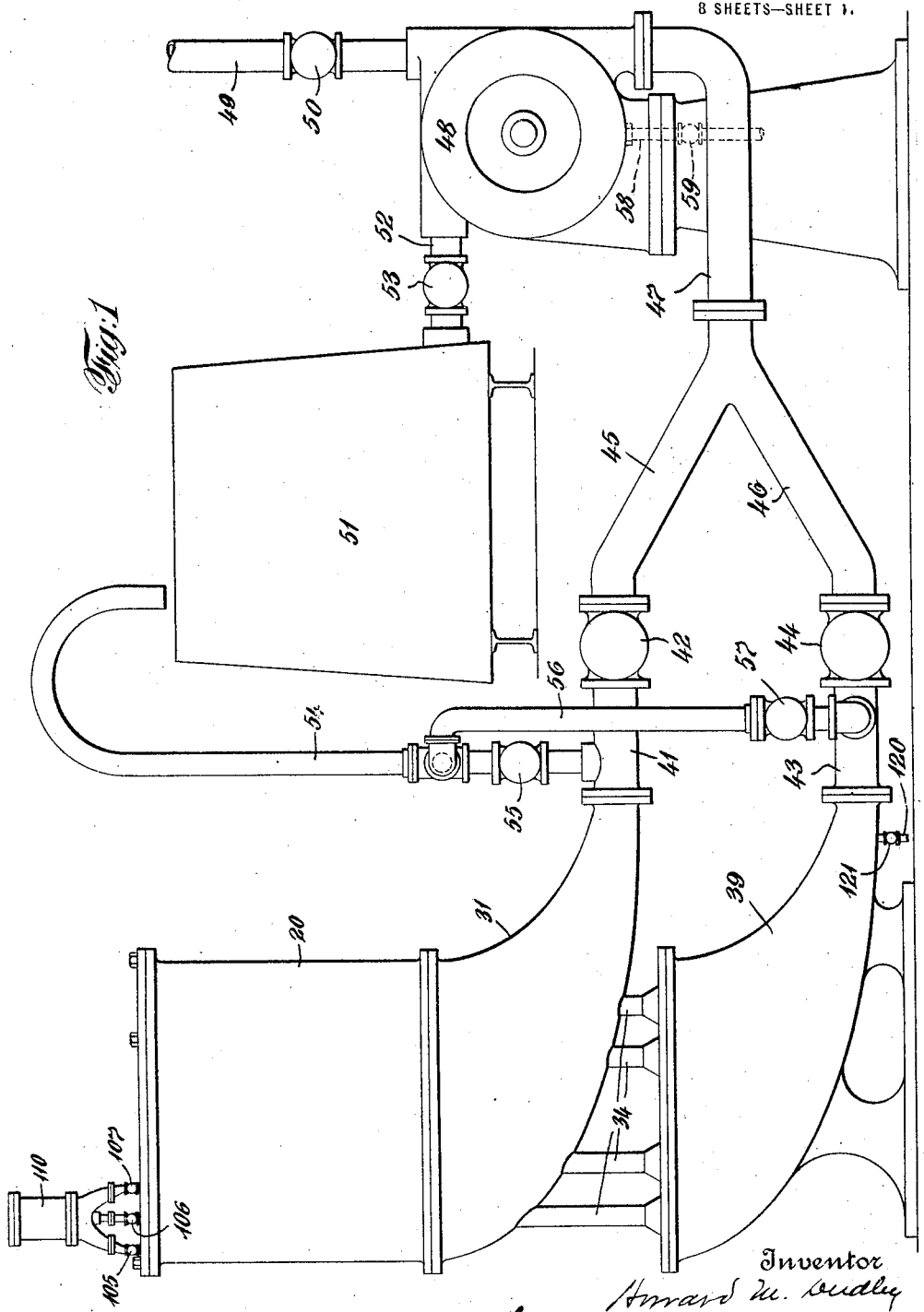
Figure 1 is an elevation of the system showing one testing device.
Figure 2:
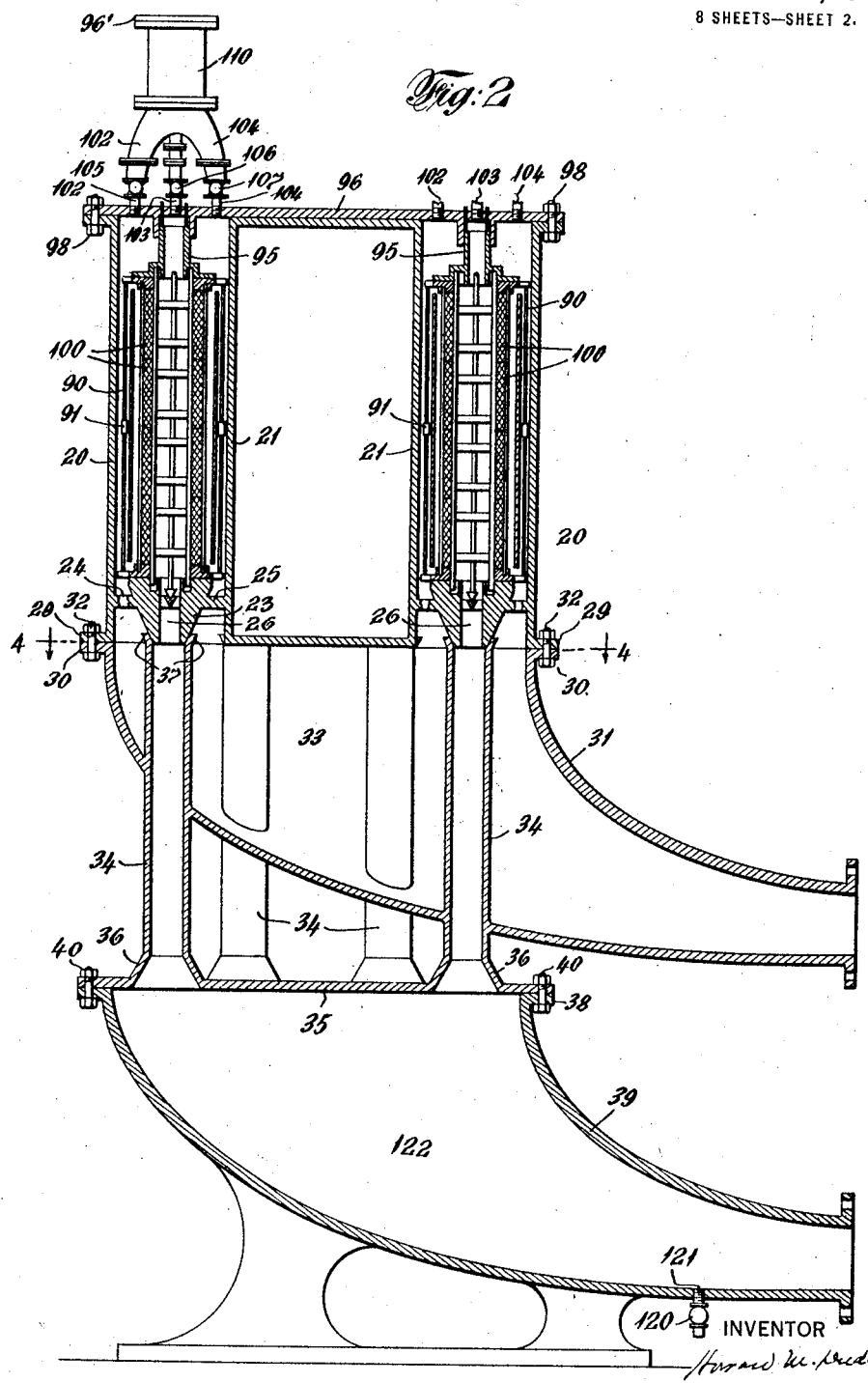
Fig. 2 is a vertical section of the fabric treating portion of Fig. 1.
Figure 3:
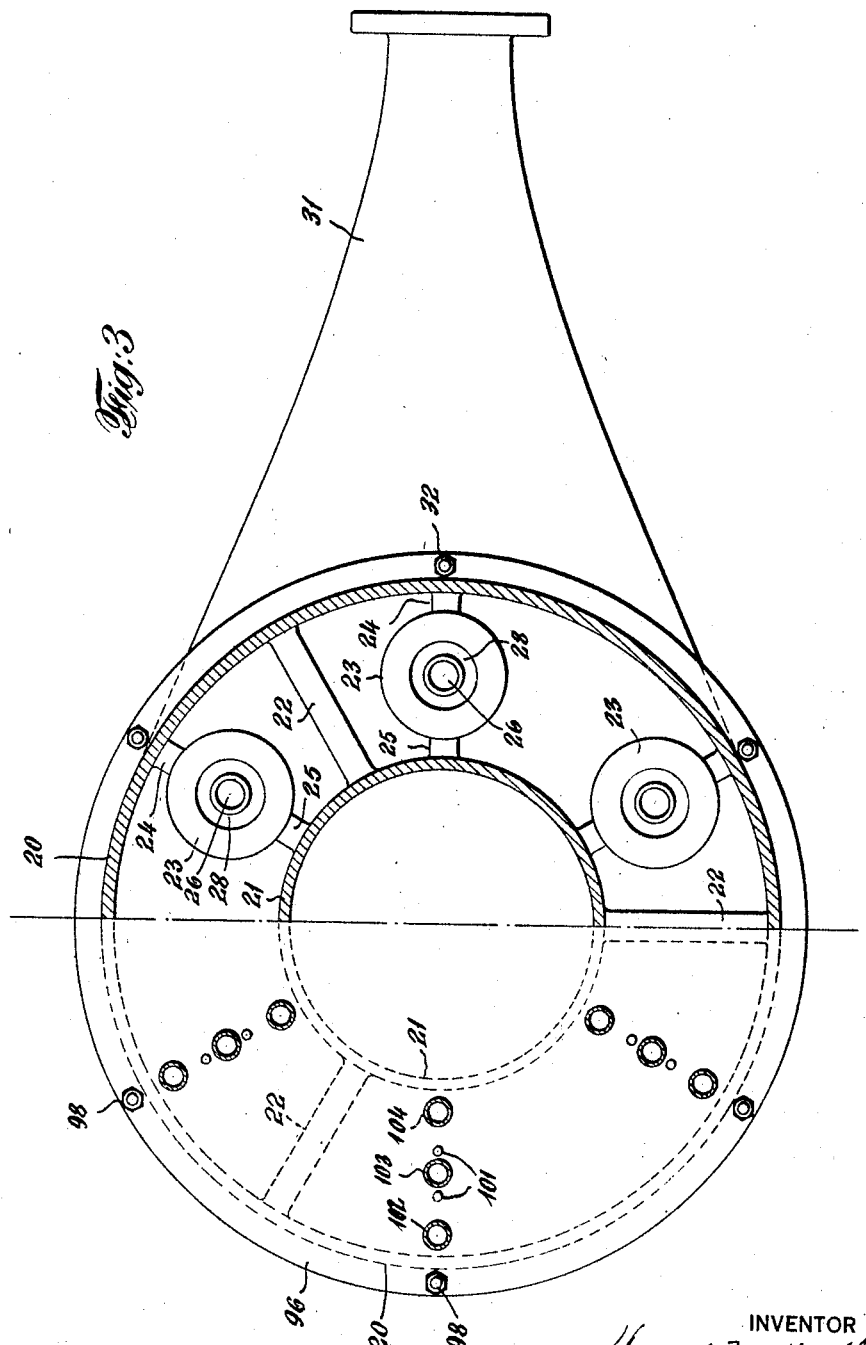
Fig. 3 is a top plan view of Fig. 2 the testing devices and spindles being removed.
Figure 4:
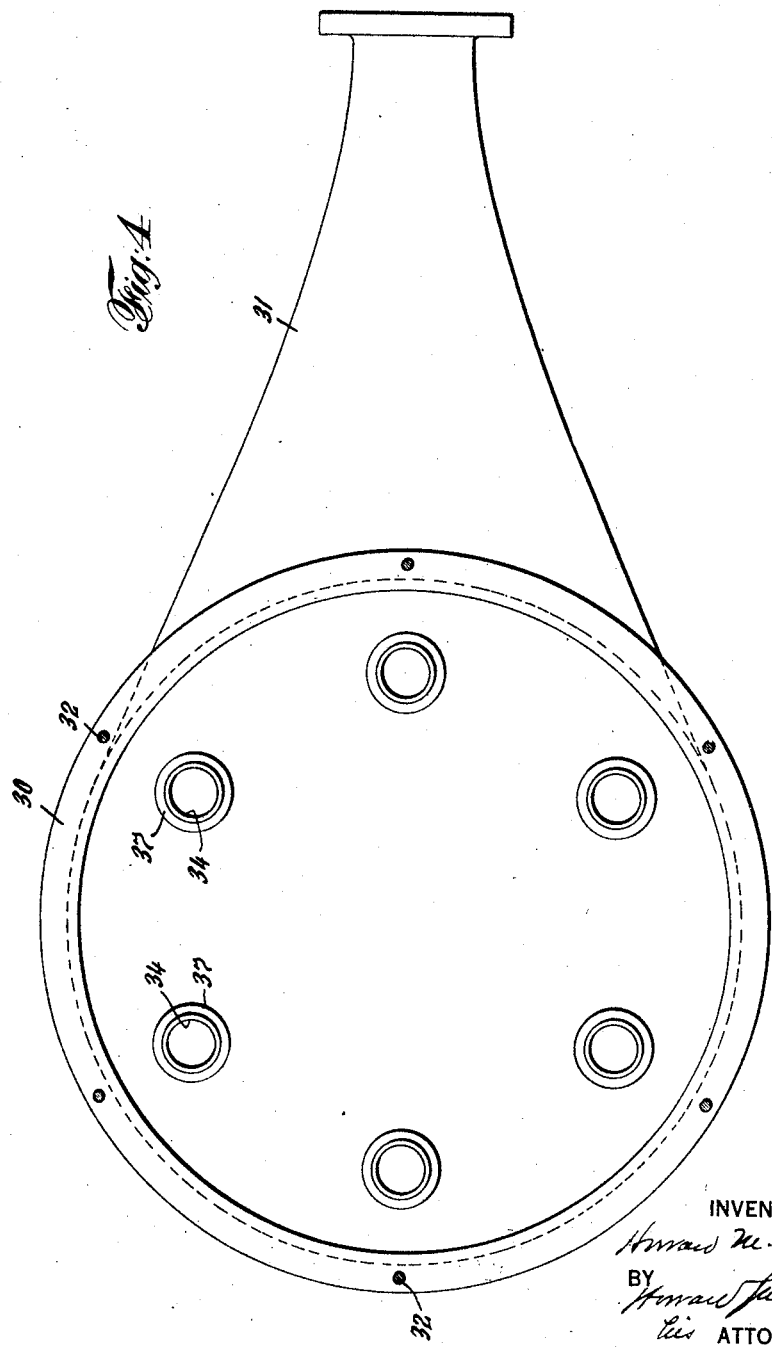
Fig. 4 is a section through the line 4—4 of Fig. 2.
Figure 5:
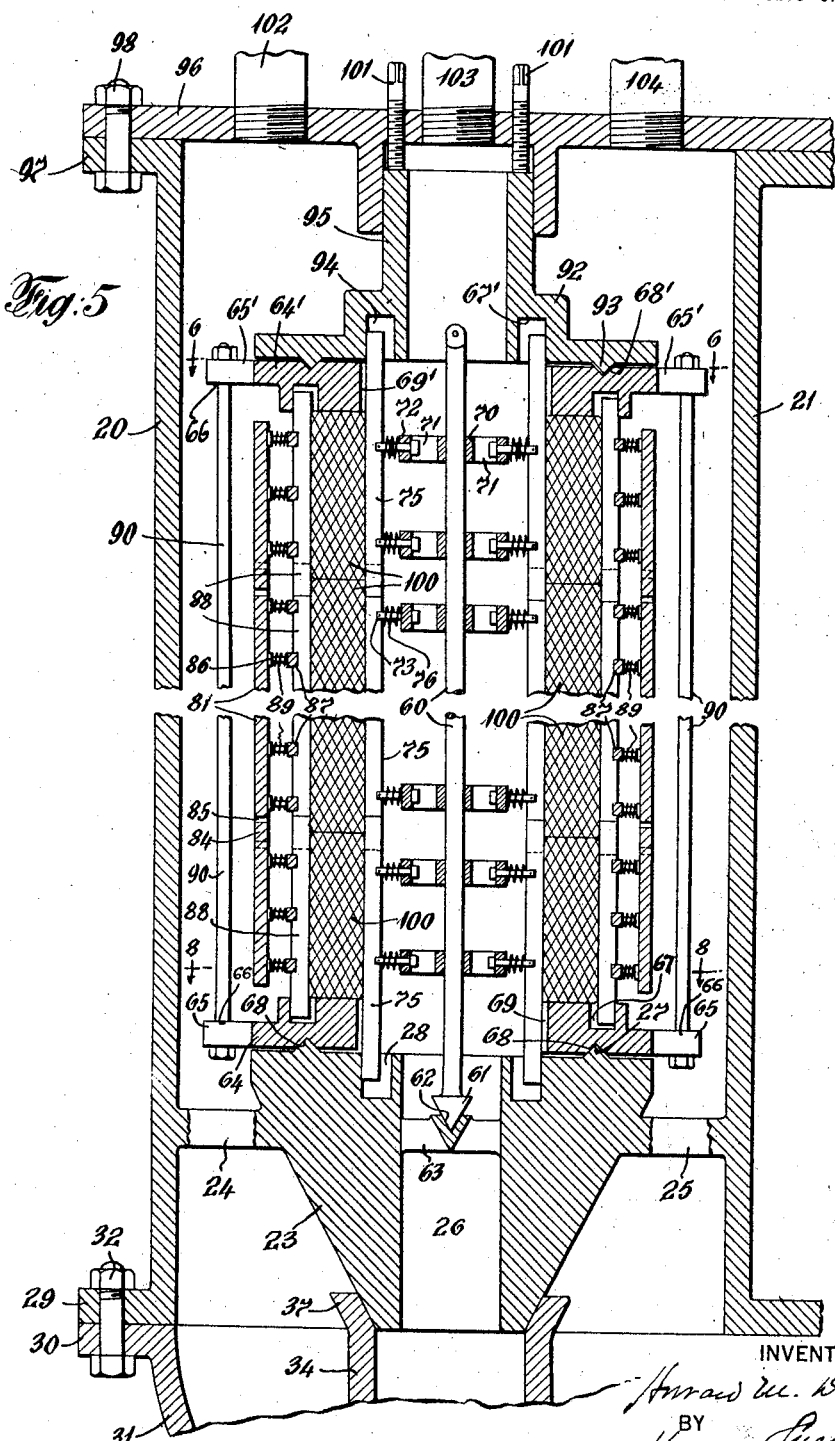
Fig. 5 is a broken enlarged vertical section of one of the fiber treating chambers with the inclosed spindle.
Figure 6:
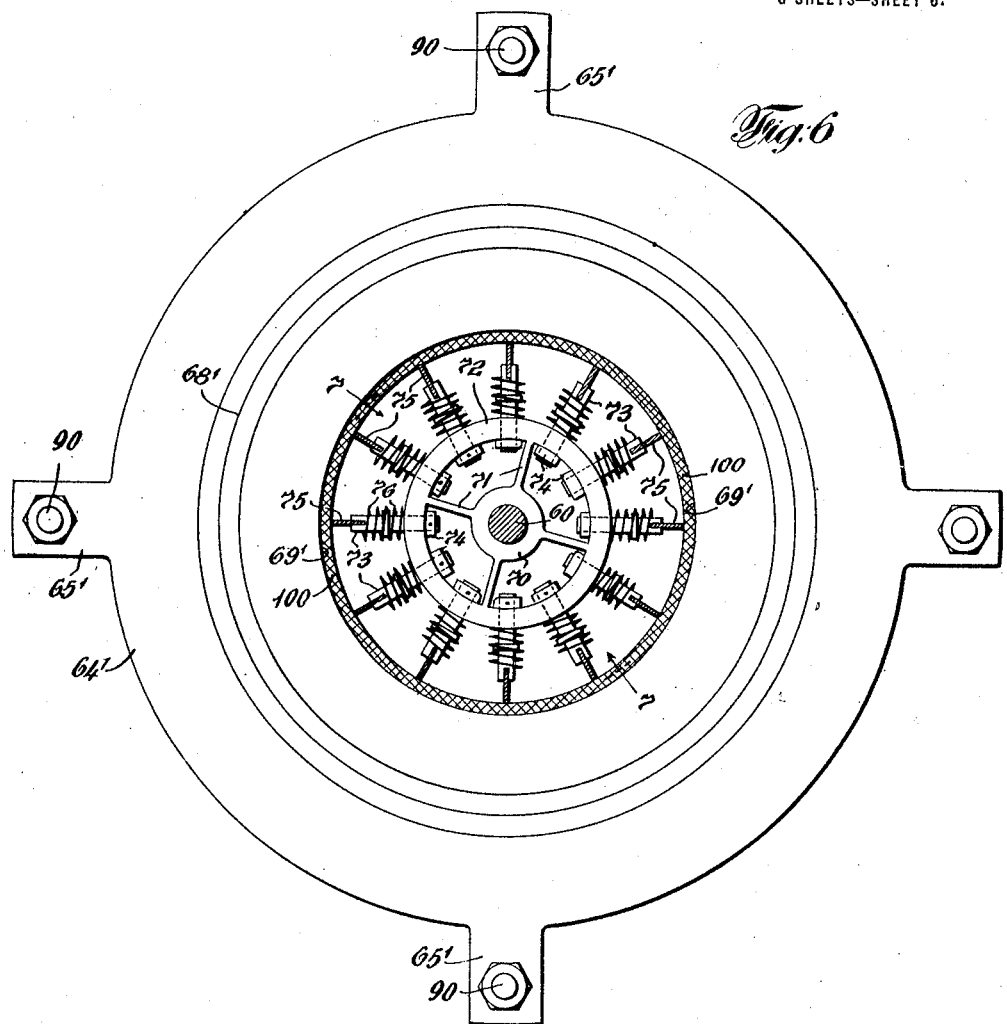
Fig. 6 is a section through the line 6—6 of Fig. 5.

The particular form of a device of my invention, shown in the accompanying drawings, comprises a cylindrical receptacle wall 20 within which is an imperforate cylinder 21 attached to the wall 20 by means of the supporting arms 22, 22. Within the receptacle is a series of downwardly converging members 23, 23 attached to the wall 20 by the supporting arms 24, 24 and to the cylindrical member 21 by the supporting arms 25, 25. Each member 23 has a central opening 26, an extended annular member 27 and an annular recess 28.

The flange 29 of the wall 20 is connected to the flange 30 of the member 31 by means of the bolts 32, 32. Extending through the chamber 33 of the member 31 and carried thereby is a series of conduits 34, 34 integral with the member 35. The lower end 36 of each conduit 34 is flared, while the upper end 37 is expanded to receive the lower end of a member 23 and form a tight joint therewith. The member 35 is attached to the flange 38 of the hollow member 39 by means of the bolts 40, 40.

The member 31 is attached to the pipe 41 carrying the valve 42, and the member 39 is attached to the pipe 43 carrying the valve 44. The pipes 41 and 43 are connected to the pipes 45 and 46 converging into the pipe 47, which is connected to the discharge chamber of the rotary pump 48. A pipe 49, carrying the valve 50, is connected to a source of treating liquid supply and to the receiving chamber of the pump 48. The bottom of the reserve tank 51 is connected to the receiving chamber of the pump 48 by means of the pipe 52 carrying the valve 53. The pipe 41 is connected to the upper part of the tank 51 by means of the pipe 54 carrying the valve 55. The pipes 43 and 54 are connected by means of the pipe 56 carrying the valve 57. A pipe 58, carrying the valve 59, is connected to a source of fresh water supply.

Each of a series of spindles capable of placement within the receptacle comprises a central bar 60, the lower end of which 61 is conical in shape and fits tightly within the conical opening 62 of the supporting arm 63 extending across the opening 26 of the member 23. An end member 64, slidable over the bar 60, has extended arms 65, 65, each having a round opening 66. The member 64 has an annular recess 67 and an angular annular recess 68 into which the projection 27 fits forming a tight joint. The member 64 also has a central opening 69. There is also a top member 64' similar to the bottom member, similar parts being designated by prime numbers. Slidable over the rod 60 is a series of rings 70, 70 each having a series of radiating arms 71, 71 attached to a ring 72. Each ring 72 has a series of outwardly extended rods 73, 73 slidable therein and maintained from displacement by the nuts 74, 74. Two of such series of rods 73 are connected to a series of blades 75, 75. Each rod 73 carries a spring 76 abutting upon the ring 72 and a blade 75. The blades 75, 75 attached to one series of rods 73, 73 are staggered with respect to the next series when placed upon the rod 60 as shown in Fig. 7.

Figure 7:
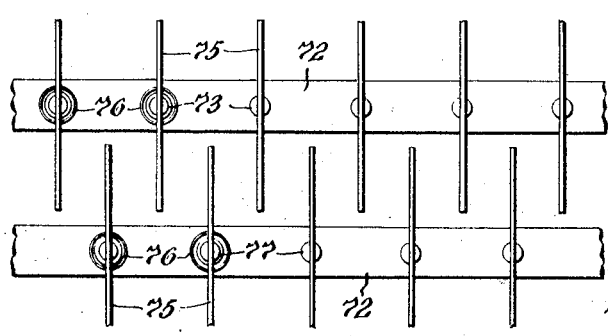
Fig. 7 is a development along the line 7—7 of Fig. 6.
Figure 8:
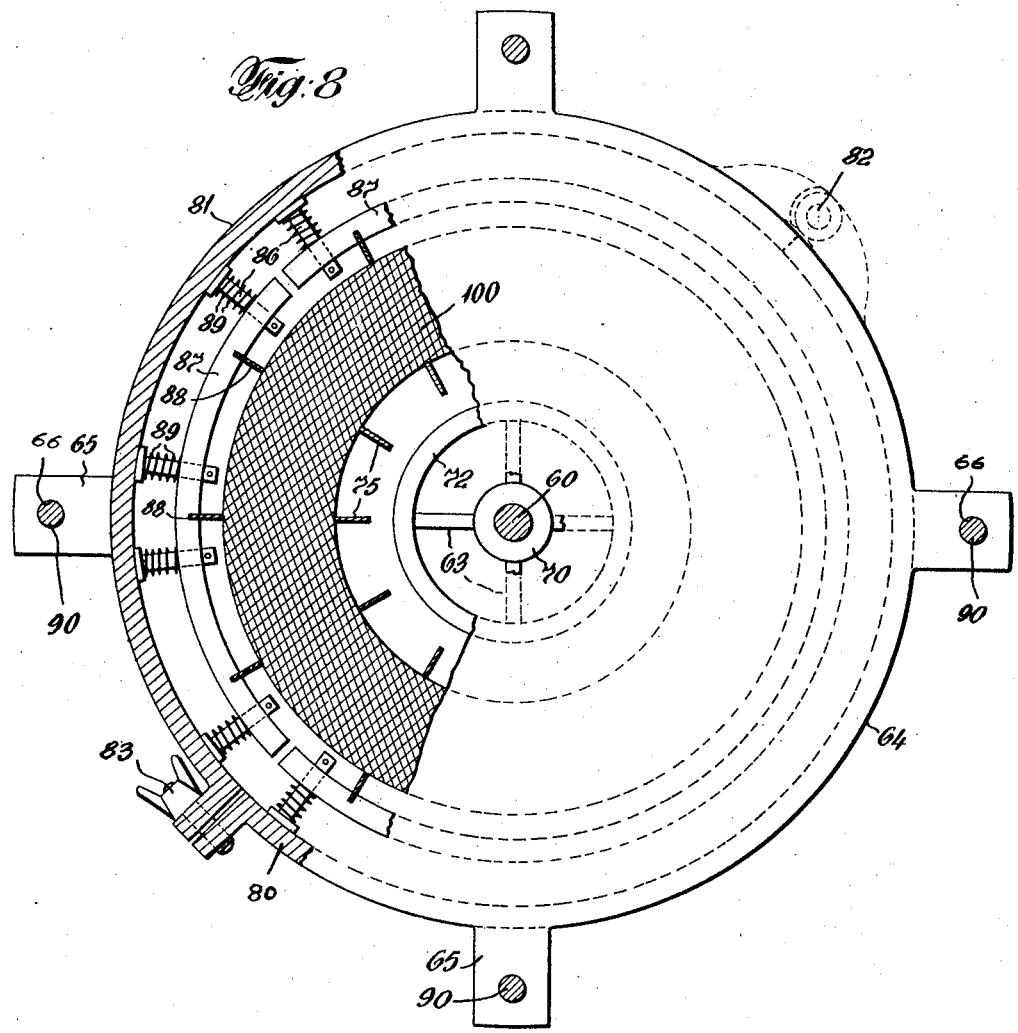
Fig. 8 is a broken section through the line 8—8 of Fig. 5.

In loading the spindles, a set of blades 75, 75, as described above, is slid over the bar 60, another set of blades slid over the bar 60 and positioned as shown in Fig. 7 and additional series of blades employed as desired. A series of warp balls 100 is then slid over the blades 75, 75 and the cover placed in position.

Figure 9:
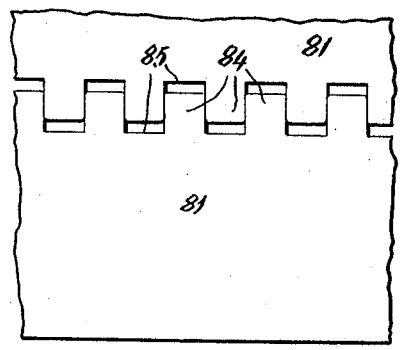
Fig. 9 is a development of the foraminous cover.

This cover comprises a series of members 81, pivoted at 82 and capable of attachment by means of the wing nut 83. The edges of these covers have extensions 84, 84 and indents 85, 85, as shown in Fig. 9, so as to allow longitudinal movement with respect to each other. A series of rods 86, 86 is fixedly attached to the member 81 and slidably extended through openings in a series of segmental bands 87, 87, the latter carrying a series of blades 88, 88. A spring 89 around each rod 86, abuts upon the members 81 and 87.

When the cover is placed around the warp balls 100, 100 and clamped thereon, the end pieces 64 and 64' are placed in position and the rods 90, 90 placed within the openings 66, 66 and the turn buckles 91, 91 tightened up, thus drawing the end pieces 64, 64' toward each other, compressing the fiber 100 and the cover tightened so that the blades 88, 88 are held firmly against the fiber.

A series of spindles with their accompanying parts are then placed within the receptacle so that the projection 27 of the member 23 fits within the recess 68 of the member 64. Upon each spindle there is placed a stepped member 92, having the projection 93 fitting tightly into the recess 68' of the member 64' and the annular recess 94 into which the upper blades 75, 75 fit. The upper portion of each stepped member 92 is provided with the hollow cylindrical portion 95.

A receptacle top 96 is attached to the flange 97, of the wall 20, by means of the bolts 98, 98. By means of the screw bolts 101, 101 extending through, and threaded within, openings within the top 96 and abutable upon the members 95, 95, the stepped members 92, 92 can be forced inwardly forming a tight joint with the members 64', 64'.

Over each spindle are three pipes 102, 103, 104 threaded within openings within the top 96, the pipe 103 being in alinement with the hollow cylinder 95. The pipes 102, 103, 104 carry respectively the valves 105, 106, 107. The pipes 105 and 104 enter the cylindrical member 108, through the upper portion of which the pipe 103 is extended. Attached to the flange 109 of the member 108 is a cylindrical receptacle or testing device 110 containing a spindle similar to the spindle in the larger device, corresponding parts being designated in Fig. 10 by prime numerals.

A drain pipe 120, carrying valve 121, is connected to the chamber 122 of the member 39.

It is thus evident that by the described construction all of the spindles are within one receptacle.

The operation of the device is as follows, the larger device and the testing device being loaded and closed:—

All of the valves are closed with the exception of valves 50, 44, 55, 105, 107 and 106 and the pump 48 started. The liquid passes from the dissolving tank, not shown, through the pipe 49 of the pump 48 and thence through the pipes 46 and 43, the chamber 122, the pipes 34, 34 into the interior of the spindles and thence outwardly through the fiber 100 into the receptacle, through the chamber 33 and the pipes 41 and 54 into the reserve tank 51. At the same time the liquid passes through the pipe 103 into the interior of the spindle and thence outwardly through the fiber into the testing device receptacle, the larger receptacle and into the reserve tank 51. When sufficient liquid has been introduced into the reserve tank, the valve 50 is closed and valve 53 opened, thus allowing continuous circulation of the liquid.

When it is desired to reverse the flow of liquid, valves 44, 55 and 106 are closed and valves 42, 57, 105 and 107 are opened. The liquid now passes from the pump 48 through the pipes 47, 45 and 41 and chamber 33 into the receptacle and thence inwardly through the fiber into the spindle and thence through the pipes 34, 34, the chamber 122 and pipes 43, 56 and 54 into the reserve tank 51 from which it passes through the pipe 52 back into the pump 48. The same operation is caused in the testing devices.

The fiber may be washed by admitting water through the pipe 58.

When it is desired to determine the condition of the fiber on any spindle, the valves 105, 106 and 107 connected therewith are closed, the top 96' removed and the contents of the testing device examined.

I do not limit myself to the particular size, shape, number or arrangement of parts as described and shown, all of which may be varied without going beyond the scope of my invention as described and claimed.

What I claim is:—

1. In a fiber treating machine, in combination, a receptacle, a series of removable hollow foraminous spindles capable of having fiber placed thereon within the receptacle, means for closing one end of the spindles, means for compressing the fiber in the direction of the axes of the spindles, means for compressing the fiber at right angles to the axes of the spindles, means for passing a liquid into the interiors of the spindles and outwardly therefrom through fiber placed thereon and means for passing a liquid from the receptacle into the interiors of the spindles through fiber placed thereon.

2. In a fiber treating machine, in combination, a receptacle, a series of removable hollow foraminous spindles capable of having fiber placed thereon within the receptacle, means for closing one end of the spindles, resilient means for compressing the fiber, means for passing a liquid into the interiors of the spindles and outwardly therefrom through fiber placed thereon and means for passing a liquid from the receptacle into the interiors of the spindles through fiber placed thereon.

3. In a fiber treating machine, in combination, a receptacle, a series of removable rods within the receptacle, a series of spaced parallel plates carried by the rods capable of having fiber placed thereon, means for passing a liquid from the receptacle through the fiber into the chamber formed by the plates and the fiber and means for passing a liquid from the chamber formed by the plates and the fiber through the fiber into the receptacle.

4. In a fiber treating machine, in combination, a receptacle, a series of removable rods within the receptacle, a series of spaced parallel plates capable of having fiber placed thereon, slidable over the rods and forming a chamber therein, means for closing one end of said chamber and means for forcing a liquid in reverse directions through the fiber.

5. In a fiber treating machine, in combination, a receptacle, a series of removable rods within the receptacle, a series of spaced parallel plates capable of having fiber placed thereon slidable over the rods forming a chamber therein, means for closing one end of said chamber, means for compressing the fiber, and means for forcing a liquid in reverse directions through the fiber.

6. In a fiber treating machine, in combination, a receptacle, a series of removable rods within the receptacle, a series of spaced parallel plates capable of having fiber placed thereon slidable over the rods forming a chamber therein, means for closing one end of said chamber, means for compressing the fiber longitudinally, means for compressing the fiber laterally and means for forcing a liquid in reverse directions through the fiber.

7. In a fiber treating machine, in combination, a receptacle, a series of removable spindles comprising a series of spaced parallel plates capable of having fiber placed thereon within the receptacle, means for closing one end of the spindles, means slidable over the plates, capable of compressing the fiber abutting upon the two ends of the fiber mass, means for continuously passing a liquid from the receptacle through the fiber masses into the interiors of the spindles and means for continuously passing a liquid from the interior of the fiber masses into the receptacle.

8. In a fiber treating machine, in combination, a receptacle, a series of removable spindles comprising a series of spaced parallel plates capable of having fiber placed thereon within the receptacle, means for closing one end of the spindles, means slidable over the plates, capable of compressing the fiber abutting upon the two ends of the fiber mass, means for compressing the fiber inwardly toward the spindles, means for continuously passing a liquid from the receptacle through the fiber masses into the interiors of the spindles and means for continuously passing a liquid from the interior of the fiber masses into the receptacle.

Signed at New York in the county of New York and State of New York this 4" day of March, 1918.

HOWARD M. DUDLEY.